United States Patent [19]

Ponsioen et al.

[11] Patent Number: 4,644,442
[45] Date of Patent: Feb. 17, 1987

[54] THREE-PHASE ISOLATING DISCONNECTOR FOR USE IN A HIGH-VOLTAGE SWITCHGEAR ARRANGEMENT

[75] Inventors: Ysbrand P. J. M. Ponsioen, Alphen A/D Rijn; Johannes A. Kemper, Nieuwegein, both of Netherlands

[73] Assignee: Holec Systemen & Componenten B.V., Hengelo, Netherlands

[21] Appl. No.: 796,225

[22] Filed: Nov. 8, 1985

[51] Int. Cl.[4] ............................ H02B 1/20; H02B 1/16
[52] U.S. Cl. ..................................... 361/341; 307/147; 200/48 R; 361/335
[58] Field of Search ............... 361/332, 333, 335, 340, 361/341, 376; 307/147, 148; 200/48 R, 48 A, 48 KB, 48 SB, 48 CB, 162, 148 R, 148 F, 63 R, 153 P, 155 R

[56] References Cited

U.S. PATENT DOCUMENTS

| | | | |
|---|---|---|---|
| 4,184,058 | 1/1980 | Irik et al. | 200/153 P |
| 4,241,379 | 12/1980 | Olsen | 361/335 |
| 4,268,890 | 5/1981 | Silbermann | 361/335 |
| 4,527,220 | 7/1985 | Boersma | 361/333 |

Primary Examiner—G. P. Tolin
Attorney, Agent, or Firm—Watson Cole Grindle & Watson

[57] ABSTRACT

A three-phase isolating disconnector for use in a high-voltage switchgear arrangement in two gas-filled chambers, separated by a wall, in said arrangement, comprising for each phase a disconnector member extending through the wall and fastened and movable therein, this disconnector member being provided with a disconnector contact in each chamber, and comprising two fixed counter disconnector contacts which are connected to other parts of the switchgear arrangement and of which one is disposed in one chamber and the other in the other chamber. The movable disconnector member is brought by rotation from a first position, in which it conductively connects together the two fixed counter disconnector contacts, to a second position in which the conductive connection is broken and in which at least one disconnector contact of the movable disconnector member is connected to an earth contact, and vice versa. The three disconnector members are embodied in the form of rotating shafts which are disposed in one plane and which can be rotated from the outside, each of them being housed in a separate bushing insulator in the wall. The two disconnector contacts of each disconnector member are each fastened to a contact holder around the rotating shaft, each of them extending, transversely in relation thereto, in a plane parallel to the wall and, on rotation from the first to the second position of the disconnector member, moving over a circle sector of 180°.

6 Claims, 5 Drawing Figures

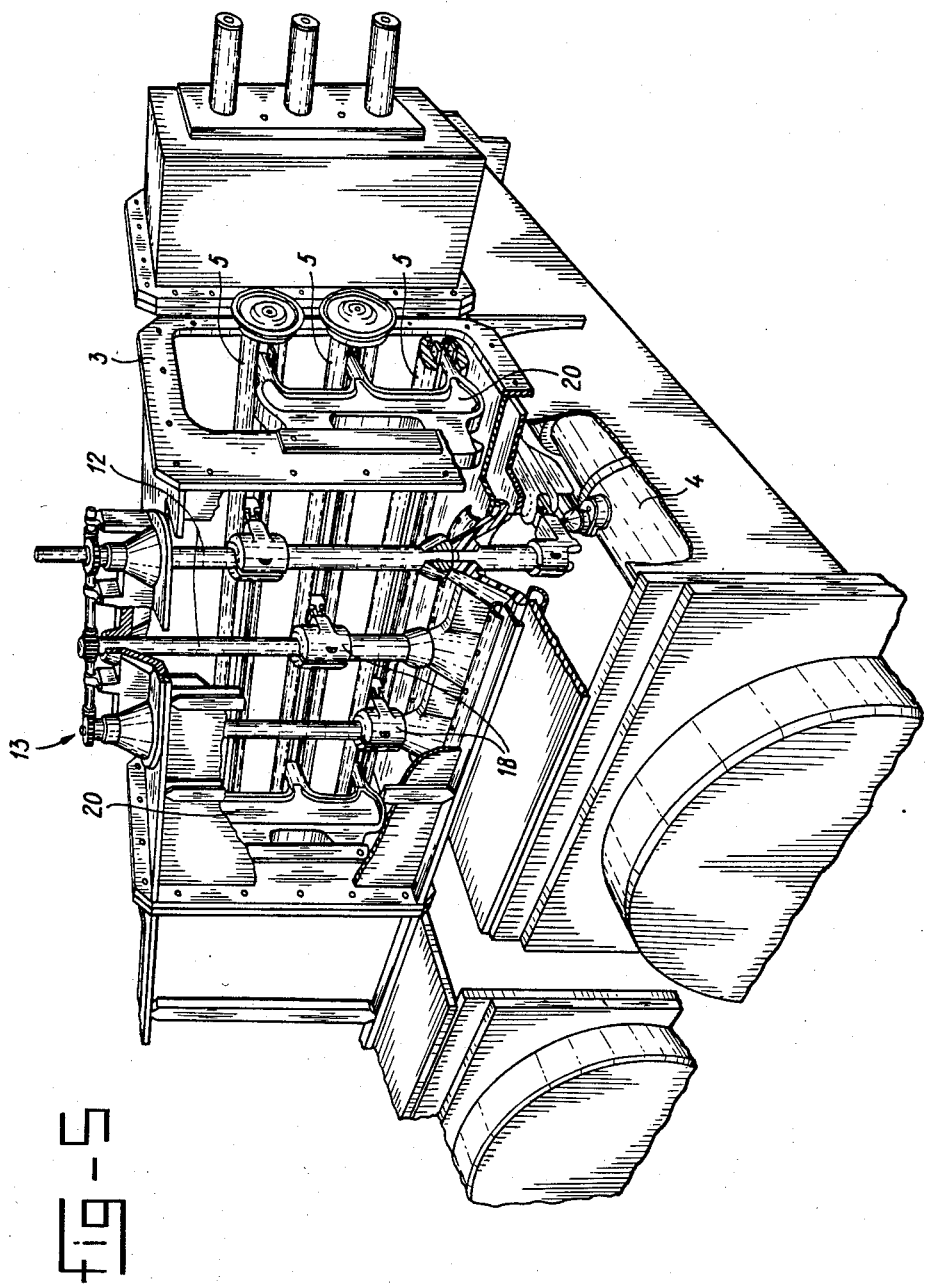

THREE-PHASE ISOLATING DISCONNECTOR FOR USE IN A HIGH-VOLTAGE SWITCHGEAR ARRANGEMENT

The invention relates to a three-phase isolating disconnector for use in a high-voltage switchgear arrangement in two gas-filled chambers, separated by a wall, in said arrangement, comprising for each phase a disconnector member extending through the wall and fastened and movable therein, this disconnector member being provided with a disconnector contact in each chamber, and comprising two fixed counter disconnector contacts which are connected to other parts of the switchgear arrangement and of which one is disposed in one chamber and the other in the other chamber, the movable disconnector member being brought by rotation from a first position, in which it conductively connects together the two fixed counter disconnector contacts, to a second position in which the conductive connection is broken and in which at least one disconnector contact of the movable disconnector member is connected to an earth contact, and vice versa. A three-phase isolating disconnector of this kind is known from U.S. Pat. No. 4,184,058.

In this U.S. Patent Specification the three-phase isolating disconnector is contained in a tubular steel casing enclosing the two aforesaid chambers. The isolating disconnector is in this case fastened in a cast-resin insulator serving as a separating wall. The cast-resin insulator contains three integrally cast copper conductors, which on each side of the insulator are provided with spherical disconnector contacts. The common bushing insulator is mounted for rotation in the steel casing and can be rotated from the outside by means of worm wheels, so that the conductors serving as disconnector members can in all circumstances be simultaneously rotated. This isolating disconnector serves both to effect electrical isolation with two break gaps, namely one on each side of the insulator, in accordance with the so-called twin-gap principle, and to effect gas separation. The isolating position can be reached by turning the common bushing insulator through an angle of 60° from the first (connecting) position, the disconnector member or middle portion extending through the bushing insulator then being earthed in the isolating position. Earthed separation of the adjoining compartments is thereby achieved.

In this three-phase disconnector fastened on a bushing insulator common to the three disconnector members the bushing insulator is obviously of considerable size and strength, while—as a result of the rotating movement—special care has to be paid to the sealing in order to prevent gas leaks. In addition, relatively fairly considerable power and time are required to turn a bushing insulator of this kind, which is equipped with three conductors passing through it. Because the housing of the known disconnector has a round shape, such a rotational construction can be very well connected thereto. A cilinder-like housing, however, is a handicap for an easy extensibility and larger compactness of the high-voltage switchgear arrangement. A rectangular housing is better suited for this purpose. The use of a rotational construction with such a rectangular housing, however, will not be optimal.

The invention aims to provide an isolating disconnector for use in a high-voltage switchgear arrangement, by which both the advantages of the known disconnector, viz. the twin-gap principle and the earthing in the opened position, and the advantages relative to the use of rectangular housings or casings such as easy extensibility and compactness, are obtained. The invention also aims to permit greater accessibility of all components accommodated in the chambers and to realise a higher switching speed of the disconnector.

In an isolating disconnector of the type first mentioned above, this is achieved in that the three disconnector members are embodied in the form of rotating shafts which are disposed in one plane and which can be rotated from the outside, each of them being housed in a separate bushing insulator in the wall, and that the two disconnector contacts of each disconnector member are each fastened to a contact holder around the rotating shaft, each of them extending, transversely in relation thereto, in a plane parallel to the wall and, on rotation from the first to the second position of the disconnector member, moving over a circle sector of 180°.

In this embodiment according to the invention a higher switching speed is possible because of the smaller mass of each separately rotatable disconnector member. The separate bushing insulators are simpler and can be produced in large numbers by appropriate production techniques. As a consequence of the fact that the sites of contact between the disconnector contacts and the counter disconnector contacts of the different phases are not situated on the periphery of a single circle, as in the prior art, but are spread out in space on different circles, a larger angular rotation of 180°, instead of 60°, is possible for opening and closing, and with the same degree of safety the disconnector can be made smaller. Moreover, if necessary, each single-phase disconnector member can be turned separately from the other two about an axis extending perpendicularly to the separating wall between the said two chambers.

Instead of the circular casings used in the prior art, it is now possible to use rectangular pressure casings, thus increasing the extensibility of the arrangement, and also the accessibility of components contained in internal chambers, to a considerable extent. As the result of this rectangular shape it is also possible to achieve greater compactness in the construction of the switchgear arrangement.

In an advantageous embodiment of the three-phase isolating disconnector according to the invention, one chamber is a busbar compartment in which is disposed a lead-through part of a three-phase busbar system, forming part of the high-voltage switchgear arrangement, this part lying in a plane extending transversely to the aforesaid wall, and in which the disconnector contacts of the three disconnector members in this chamber lie in mutually offset parallel planes and cooperate with the three fixed counter disconnector contacts, each of which is mounted entirely field-free in a separate busbar of the lead-through part of the busbar system.

In another advantageous embodiment of the three-phase isolating disconnector according to the invention, one chamber is a cable termination compartment, in which three cable termination conductors connected to the three incoming cables are situated in a plane lying parallel to the aforesaid wall, and in which the disconnector contacts of the three disconnector members lie in a common plane in this chamber and cooperate with the three fixed counter disconnector contacts, each of which is in the form of a terminal contact of the three cable termination conductors.

As a rule a high-voltage switchgear arrangement, which is constructed for connecting and breaking high voltages, will be equipped with a cable termination compartment for the input or output of the electrical energy, a power interrupter compartment for connecting and breaking of the energy current, and a busbar compartment for the output or input and distribution respectively for the electrical energy. These three compartments are in principle filled with gas at the same pressure, for example SF6 gas. As described in the above-mentioned U.S. Patent Specification, the disconnectors between the cable termination compartment and the power interrupter compartment, and between the power interrupter compartment and the busbar compartment, serve two purposes, namely gas separation between adjoining compartments and electrical isolation of the same compartments by means of two electrical break gaps, one on each side of the wall, and simultaneous earthing of the middle portion of the isolating disconnector.

In a further advantageous embodiment of the invention each disconnector contact has two knife contacts which extend, transversely to the associated disconnector member, in planes parallel to the wall and which in the first and second positions of the disconnector member engage respectively on each side on the fixed counter disconnector contact and on the fixed earth contact, if the latter is provided in the respective chamber, which counter disconnector contact and earth contact extend in the direction of the movable disconnector member. These knife contacts are simple and robust and because of their opening characteristic have a positive influence in removing parasitic capacities.

The invention will be further explained below with the aid of one example of embodiment and with reference to the drawings, in which:

FIG. 3 is a sectional view of a high-voltage switchgear arrangement provided with the compartments and isolating disconnectors according to the invention which were mentioned in connection with FIG. 1;

FIG. 5 is a view in perspective, partly cut away, of a busbar- and power interrupter compartment with a three-phase isolating disconnector according to the invention.

As a rule a high-voltage switchgear arrangement will serve two purposes. The arrangement will form a junction point at which cables, lines or transformers can as desired be connected or disconnected, and the arrangement will be used to permit selective protection, whereby in the event of short circuit or overload only the affected portion of the system is disconnected. For this purpose a high-voltage switchgear arrangement of this kind must comprise three basic elements:

1. A busbar system of the single busbar or double busbar type. The three-phase busbars of this system are held in the busbar compartment by insulators.

2. A circuitbreaker element switching the electrical power, i.e. the power interrupter which is accommodated in a separate compartment and which consists of three single-phase circuitbreakers.

3. A junction or connection to the incoming cables, transformers or overhead lines—the so-called termination compartment. This compartment may be provided with voltage transformers for measurements and the like, and with earth switches. The incoming connections in the termination compartment may consist of cables of the dry, oil-filled or gas pressure type, direct connections to a transformer, or busbar bushings with insulators for open-line connection.

The three main compartments are in principle all filled with pressurized gas, for example SF6 gas. The power interrupter compartment is connected both to the busbar compartment and to the cable termination compartment by way of one or more isolating disconnectors.

These disconnectors play an important part in the maintenance, inspection or possible extension of the switchgear arrangement. The disconnector must comply with the requirement that it should be possible to work safely on one side of the disconnector while a normal operating voltage is maintained on the other side. It must for example be possible to work on the power interrupter while the other component, for example the busbar system, remains under voltage. Since the above-mentioned compartments practically always contain gas under pressure because of the high voltages, this will also mean that a gas separation must be provided between the main components. The disconnector therefore forms not only an electrical isolator but also a gas separator. During maintenance work on the power interrupter the adjoining disconnectors are opened. Since the compartments are under pressure, the bushing insulator must form a pressureproof barrier.

Figure 1:
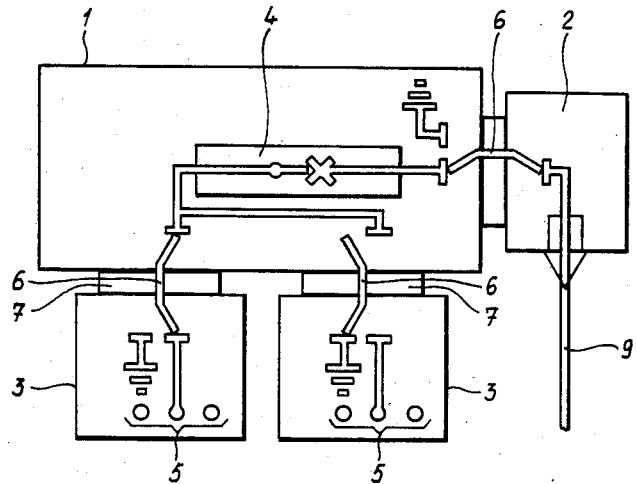
FIG. 1 shows schematically the construction of a high-voltage switchgear arrangement having a power interrupter compartment, a cable termination compartment, two busbar compartments, and isolating disconnectors disposed between the compartments.

FIG. 1 shows schematically the layout for a single phase of a high-voltage switchgear arrangement comprising a power interrupter compartment 1, a cable termination compartment 2, and two busbar systems compartments 3. In addition, 9 indicates the incoming cable, 4 the power interrupter or circuitbreaker, and 5 the busbars of a three-phase busbar system. Between the power interrupter compartment 1 and the other compartments are shown respective bushing insulators 7, each with an associated disconnector 6. In the right-hand compartment it is indicated diagrammatically that in the open position of the disconnector 6 two break gaps come about, one on each side of the bushing insulator, while the middle portion is earthed. The other two disconnectors are shown in the closed or through-connecting position. This construction also provides the advantage that no separate compartments are required for the disconnectors.

Figure 2:
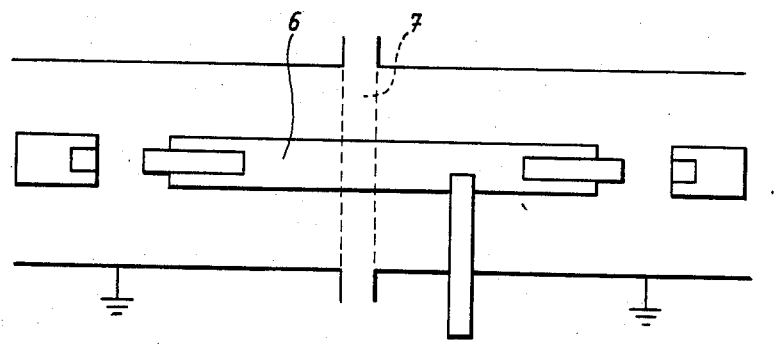
FIG. 2 is a stylized illustration of an isolating disconnector.
Figure 2:
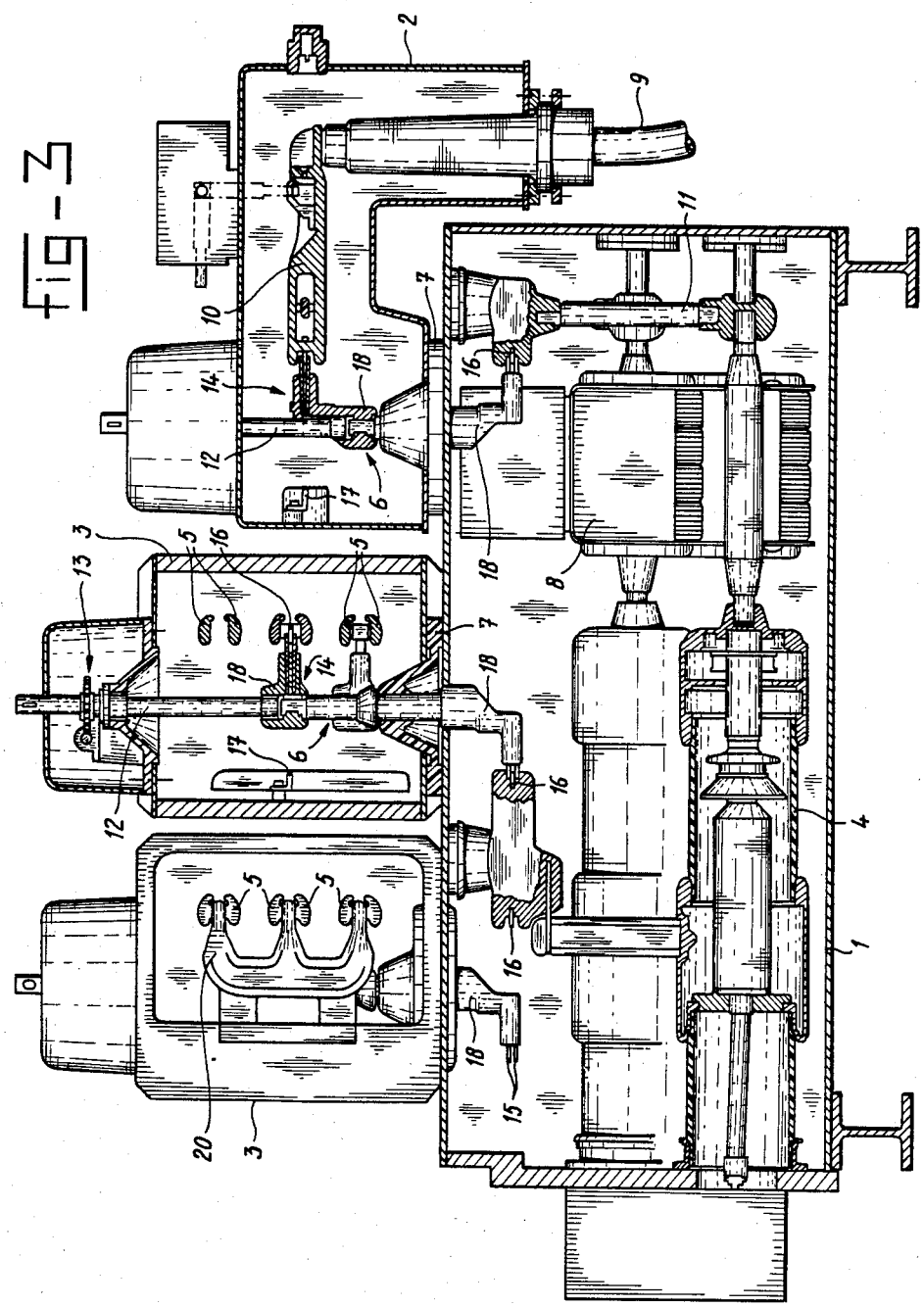

FIG. 2 shows in stylized form a disconnector 6 of the kind in question, with the associated bushing insulator 7. The disconnector is shown in the open position, with two electrical break gaps, one on each side of the insulator, while the middle portion is earthed to the metal casing. Earthed isolation is thereby achieved between a conductor under voltage and the portion or compartment in which work is being done, for example in FIG. 1 between the power interrupter 4 and the right-hand busbar compartment 3. The disconnected part or compartment can then be safely inspected and tests can be carried out and extensions undertaken without any danger to personnel.

FIG. 3 shows in greater detail a sectional view of the high-voltage switchgear arrangement shown in FIG. 1. Above the power interrupter compartment containing the power interrupter 4 and the current transformer 8 are shown the two busbar compartments 3, each of which contains a three-phase busbar system, and the cable termination compartment 2 containing an incoming cable 9. It will be clear that in this three-phase high-voltage switchgear arrangement the cable termination compartment 2 will actually contain three disconnectors 6 which are disposed one behind the other and which are fastened rotatably in the wall by means of separate pressureproof bushing insulators 7. It will also be clear that between the power interrupter compartment 1 and the right-hand and left-hand busbar compartments 3 respectively three separate disconnectors 6 will be provided for the three phases. In the closed position the disconnector 6 in the cable termination compartment 2 forms an electrical connection between the end of the conductor 10 connected to the incoming cable 9 and the connection 11 of the current transformer 8. For the disconnectors 6 between the power interrupter 4 and the busbar system 5 in the right-hand busbar compartment 3 it is indicated that the middle disconnector is connected via the disconnector member 12 and the disconnector contact 14 to a counter disconnector contact 16 on a busbar. This disconnector is also connected in the power interrupter compartment to a counter disconnector contact 16 associated with the power interrupter 4.

Figure 4:
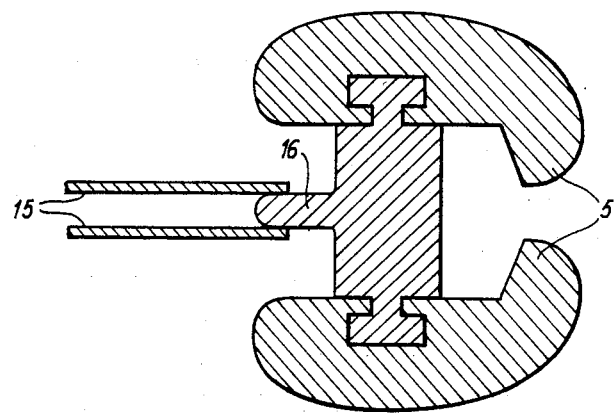
FIG. 4 is an elevation of the knife contacts of a disconnector contact and of the counter disconnector contact cooperating therewith and housed in a busbar section.

The disconnector members are driven either separately or by a common motor mechanism, so that in contrast to the prior art the mass inertia of each separate disconnector is substantially reduced. The speed of switching is also greatly increased thereby. The disconnector members are moved through an angle of 180° by means of plastic shafts which in turn are driven by a worm wheel transmission in the disconnector drive 13, which is mounted above the cable termination compartment 2 and above the busbar compartments 3. Each disconnector member 12 comprises, on each side of the bushing insulator 7, a disconnector contact 14 mounted on a bush-shaped contact holder 18. These disconnector contacts 14 lie in parallel planes and project from the disconnector members 12. Each disconnector contact 14 consists mainly of two knife contacts 15, which in the through-connecting position of the disconnector cooperate with a counter disconnector contact 16, as indicated in FIG. 4. In the busbar and cable termination compartments the knife contacts cooperate in the open position of the disconnector with an earth contact 17 fastened to the wall of the respective compartment.

FIG. 4 shows a sectional view of a busbar section belonging to a single busbar 5, with its counter disconnector contact 16 which projects towards the disconnector and which is engaged by the two knife contacts 15 of a disconnector contact. Each busbar consists essentially of two electrically conductive sections, e.g. of aluminium, between which the counter disconnector contacts 16 and, as indicated in FIG. 5, a suspension insulator 20 are fastened. The advantage of this is that these components are situated in a field-free region, so that no special measures are required to avoid electrical stress and a high degree of freedom for the mechnical design is retained.

Plugs are integrally cast in the bushing insulator. These plugs are provided on both sides with threaded bushes, so that the bushing insulator can be fastened to a compartment by means of bolt connections. These bolts are fitted from the compartment, so that it is possible to remove compartments without having to open adjoining compartments. Thus, each compartment can be removed without affecting the adjoining compartment, by detaching the compartment in question from the disconnector body. The gas seal is obtained by means of a sealing ring, such as an O-ring, held in a groove in the bushing insulator.

In the perspective view in FIG. 5 it can be seen that the three busbars of the continuous busbar system are fastend by means of three-pronged insulators 20 to the wall of the busbar compartment 3, which is mounted above the power interrupter compartment 1. The three disconnector members 12 driven by the drive 13 effect the electrical through-connection or interruption of the busbar system 5 and the power interrupter 4.

We claim:

1. A three-phase isolating disconnector for use in a high-voltage switchgear arrangement in two gas-filled chambers, separated by a wall, in said arrangement, comprising for each phase a disconnector member extending through the wall and fastened and movable therein, this disconnector member being provided with a disconnector contact in each chamber, and comprising two fixed counter disconnector contacts which are connected to other parts of the switchgear arrangement and of which one is disposed in one chamber and the other in the other chamber, the movable disconnector member being brought by rotation from a first position, in which it conductively connects together the two fixed counter disconnector contacts, to a second position in which the conductive connection is broken and in which at least one disconnector contact of the movable disconnector member is connected to an earth contact, and vice versa, characterized in that the three disconnector members are embodied in the form of rotating shafts which are disposed in one plane and which can be rotated from the outside, each of them being housed in a separate bushing insulator in the wall, and that the two disconnector contacts of each disconnector member are each fastened to a contact holder around the rotating shaft, each of them extending, transversely in relation thereto, in a plane parallel to the wall and, on rotation from the first to the second position of the disconnector member, moving over a circle sector of 180°.

2. A three-phase isolating disconnector according to claim 1, in which one chamber is a busbar compartment in which is disposed a lead-through part of a three-phase busbar system, forming part of the high-voltage switchgear arrangement, this part lying in a plane extending transversely to the aforesaid wall, and in which the disconnector contacts of the three disconnector members in this chamber lie in mutually offset parallel planes and cooperate with the three fixed counter disconnector contacts, each of which is mounted entirely field-free in a separate busbar of the lead-through part of the busbar system.

3. A three-phase isolating disconnector according to claim 1, in which one chamber is a cable termination compartment, in which three cable termination conductors connected to the three incoming cables are situated in a plane lying parallel to the aforesaid wall, and in which the disconnector contacts of the three disconnector members lie in a common plane in this chamber and coooperate with the three fixed counter disconnector contacts, each of which is in the form of a terminal contact of the three cable termination conductors.

4. A three-phase isolating disconnector according to claim 1, in which each disconnector contact has two knife contacts which extend, transversely to the associated disconnector member, in planes parallel to the wall and which in the first and second positions of the disconnector member engage respectively on each side on the fixed counter disconnector contact and on the fixed earth contact, if the latter is provided in the respective chamber, which counter disconnector contact and earth contact extend in the direction of the movable disconnector member.

5. A high-tension switchgear arrangement provided with a three-phase isolating disconnector according to claim 2, in which each chamber is in the form of a rectangular metal casing.

6. A high-tension switchgear arrangement provided with a three-phase isolating disconnector according to claim 3, in which each chamber is in the form of a rectangular metal casing.

* * * * *